(12) United States Patent
Evennou et al.

(10) Patent No.: US 9,881,397 B2
(45) Date of Patent: Jan. 30, 2018

(54) METHOD AND SYSTEM FOR CONSTRUCTING A GRAPH REPRESENTING A BUILDING

(75) Inventors: Frederic Evennou, Grenoble (FR); Marc Berenguer, Revel (FR)

(73) Assignee: ORANGE, Paris (FR)

( * ) Notice: Subject to any disclaimer, the term of this patent is extended or adjusted under 35 U.S.C. 154(b) by 200 days.

(21) Appl. No.: 13/976,926

(22) PCT Filed: Dec. 20, 2011

(86) PCT No.: PCT/FR2011/053076
§ 371 (c)(1),
(2), (4) Date: Jun. 27, 2013

(87) PCT Pub. No.: WO2012/089959
PCT Pub. Date: Jul. 5, 2012

(65) Prior Publication Data
US 2013/0271468 A1    Oct. 17, 2013

(30) Foreign Application Priority Data

Dec. 28, 2010  (FR) ...................... 10 61314

(51) Int. Cl.
*G06T 11/20*  (2006.01)
*G09B 29/00*  (2006.01)

(52) U.S. Cl.
CPC ............ *G06T 11/206* (2013.01); *G09B 29/00* (2013.01); *G09B 29/004* (2013.01)

(58) Field of Classification Search
CPC ...... G01C 21/206; G06T 11/206; G06T 17/05
See application file for complete search history.

(56) References Cited

U.S. PATENT DOCUMENTS 7,161,483 B2 *  1/2007  Chung ........................ 340/531
7,206,585 B2 *  4/2007  Gilham et al. ............... 455/450
(Continued)

FOREIGN PATENT DOCUMENTS

EP  1 804 149  4/2007
FR  2 886 501  12/2006

OTHER PUBLICATIONS

Shin et al., Wi-Fi Fingerprint-Based Topological Map Building for Indoor User Tracking, 2010 IEEE 16th International Conference on Embedded and Real-Time Computing Systems and Applications, Aug. 2010, pp. 105-113.*

(Continued)

*Primary Examiner* — Charles Tseng
(74) *Attorney, Agent, or Firm* — Knobbe, Martens, Olson & Bear LLP (57) ABSTRACT

One inventive aspect relates to a method of constructing a graph representing a building (BAT) in which a person (U) moves. In one inventive aspect, the method is adapted to receiving information about the movement of the person in the building over a period of time, the information being collected and transmitted by a portable device (D) associated with the person (U), and in constructing at least one branch of the graph from received movement information. One inventive aspect also provides a method of remotely tracking the activity of a person in a building as a function of the constructed graph. One inventive aspect also provides a server (S) implementing the method of constructing a graph.

14 Claims, 7 Drawing Sheets

(56) References Cited

U.S. PATENT DOCUMENTS

| | | | |
|---|---|---|---|
| 7,587,274 B2* | 9/2009 | Kaldewey et al. | 701/434 |
| 8,947,421 B2* | 2/2015 | Uetabira | 345/419 |
| 2009/0054076 A1* | 2/2009 | Evennou et al. | 455/456.1 |
| 2010/0121567 A1* | 5/2010 | Mendelson | 701/206 |
| 2010/0203901 A1* | 8/2010 | Dinoff | H04W 4/022 455/456.3 |
| 2010/0325074 A1* | 12/2010 | Ng et al. | 706/12 |

OTHER PUBLICATIONS

Zhuang et al., SMART: Simultaneous Indoor Localization and Map Construction Using Smartphones, The 2010 International Joint Conference on Neural Networks, Jul. 2010.*

Werner et al., Organisation of Indoor Navigation Data from a Data Query Perspective, Ubiquitous Positioning Indoor Navigation and Location Based Service, Oct. 2010.*

Frederic Evennou, Technologies, *Techniques et application de localization indoor*, CRESITT-Orleans, Sep. 3, 2010, 57 pages.

Frederic Evennou, Techniques et technologies de localization avancees pour terminaux mobiles dans les environnements indoor, Universite Joseph Fourier—Grenoble I Sciences. Technologie. Sante, Jan. 22, 2007, pp. 159-182.

International Search Report received in International Patent Application No. PCT/FR2011/053076, dated May 3, 2012, in 5 pages.

\* cited by examiner

METHOD AND SYSTEM FOR CONSTRUCTING A GRAPH REPRESENTING A BUILDING

This application is a national stage application under 35 U.S.C. §371, claiming priority to International Application No. PCT/FR2011/053076, having an international filing date of Dec. 20, 2011, which claims priority to French Patent Application No. 1061314, filed on Dec. 28, 2010, each of which is hereby incorporated by reference in its entirety and for all purposes.

The invention relates to the field of smart homes and more particularly to services for providing assistance to the person on the basis of remotely tracking the activity of such a person, i.e. that person's activity in the home environment.

The systems that have been developed in this field are mostly designed for tracking people who are considered as being "fragile", typically elderly people living alone. Such systems set out to determine as soon as possible any abnormal modification to the activity of such a person so as to trigger action of an emergency service, a doctor, or a relative of that person, should that be necessary.

For example, information concerning time spent in each of the rooms and the movements carried out in the home environment make it possible to detect changes in the behavior of the person. A change such as a lack of movement may for example be considered as being indicative of a problem with moving or of illness.

Presently-known systems for remotely tracking a person at home require a plan of that person's home in digital form. It is often difficult for the people for whom these services are intended to generate such a plan in digital form and it is often necessary for a specialized technician to act on site in order to construct the plan, e.g. using tools for computer-assisted design (CAD).

Patent application EP 1 804 149 published on Jul. 4, 2007 discloses a movable robot that is arranged to create a map of the environment in which it is located. The movable robot has means for controlling its speed and travel direction, means for detecting its movements, and means for detecting obstacles located around it. The obstacle detector means comprise a laser emitter used for measuring the distances of the obstacles from the robot. They are possibly assisted by a radar. The movement detection means may for example be odometers installed on the wheels of the robot.

The sensors on board such robots require very great stability. For example, the emitted laser beams must be oriented very accurately relative to the horizontal.

Such robots are expensive.

There therefore exists a need to generate a plan from equipment that is less expensive.

The invention seeks to improve that situation.

To this end, the invention provides a graph construction method for constructing a graph representing a building in which a person moves, the method being characterized in that it comprises the following steps:

receiving information relating to the movement of said person over a period of time in said building, said information being collected and transmitted by a portable device associated with said person; and constructing at least one branch of said graph from received movement information.

The portable device associated with the person may for example be placed in a pocket of the person's clothes. Thus, the device makes the same movements as the person. It does not require its own locomotion means. As a result it is less expensive than a prior art robot.

The movement information is collected progressively whenever the person moves. Information collection does not require the person to perform any action. Collection therefore does not require any special competence and can be performed by any person. The only constraint for the person is to ensure that the portable device stays with them. The movement information collected over a given period of time enables a remote server to construct a plan in the form of a graph of the person's environment. Construction of the graph does not require an initial plan.

In a particular implementation of the graph construction method, the movement information is time-stamped and the method further includes an allocation step of allocating a room identifier identifying a room of said building to said branch as a function of: a predetermined list of rooms; at least one predefined usage rule relating to said rooms; and time-stamped movement information.

The usage rules, e.g. predefined by a human operator or by an automatic learning system, are determined as a function of the life habits of the person. These habits are general habits, e.g. sleeping in a bedroom, or else particular habits of the person, e.g. watching television after the mid-day meal. These usage rules make it possible to allocate a room identifier to a branch of the graph as a function of the movements of the person over time.

In a particular implementation of the graph construction method, the construction step includes a step of determining a path followed by the person during said movements as a function of received movement information, and a step of determining at least one path segment corresponding to a geographical zone.

The movement information makes it possible to retrace the path traveled by the person. The information recorded over a period of time of long duration reveals paths that are repeated. These repeated paths enable zones to be defined by position.

According to a particular characteristic, the collected movement information comprises angular velocity, acceleration, and magnetic field.

Angular velocity, acceleration, and magnetic field sensors are sensors that are simple and inexpensive.

According to another characteristic that may be used on its own or in combination with the preceding characteristic, the movement information is collected relative to three axes in a three-dimensional reference frame.

Collecting information along three axes makes it possible to make use of the information regardless of the orientation of the device.

According to a particular characteristic that may be used on its own or in combination with the preceding characteristics, the movement information is collected by an inertial navigation module of the portable device.

An inertial navigation module is compact and makes it possible to collect movement information in a manner that is simple for the user.

According to a particular characteristic that may be used on its own or in combination with the preceding characteristics, the portable device is a cell phone fitted with an inertial navigation module.

The use of home equipment such as a cell phone is not intrusive for the person whose movements are to be recorded. The device is easily accepted by the people targeted for use of the service.

In a particular implementation of the graph construction method, the allocation of a room name is also a function of a measurement performed by a sensor in the building and/or of an event that is detected in the electrical circuit of the building.

The use of sensors and/or detected events in the electricity network of the building, e.g. switching on an oven, makes it possible to increase the reliability of the method when allocating a room name.

In a particular implementation, the graph construction method further includes a second step of receiving information relating to the movement of the person, and the construction and allocation steps are reiterated as a function of data received during the second reception step.

Collecting movement information over a new period of time serves to increase the accuracy of the graph and the accuracy with which room names are allocated.

In an implementation that may be used on its own or in combination with a preceding implementation, the graph construction method further includes a step of calculating at least one reference value representative of the activity of the person during at least one time interval included in said period of time, the calculation being performed as a function of said room identifier.

The movement information also makes it possible to measure the activity of a person. This activity measurement gives rise to a value representative of activity, such as for example the duration of meals, the volume occupied in the building, . . . .

The invention also provides a method of remotely tracking the activity of a person in a building, the method comprising the following steps:
- constructing a graph and allocating a room identifier by means of the graph construction method as described above;
- receiving movement information collected over a second period of time subsequent to said period of time; and
- as a function of said room identifier, calculating at least one current value representative of the activity of the person during at least one time interval included in said second period of time.

The tracking method makes it possible to track changes in the activity of the person over time. By comparison with reference values determined during a learning stage, it is possible to determine whether the person is eating, is moving about, is sleeping sufficiently, . . . . By way of example, the learning stage is the stage during which the graph is constructed.

In a particular implementation, the method of remotely tracking the activity of a person further includes the following steps:
- comparing at least one said current value with at least one said reference value; and
- triggering an alert process if the difference between the compared values is greater than a predetermined threshold.

In the event of an anomaly, an alert process may be triggered. By way of example, the alert may consist in causing a doctor to intervene or in warning a relative.

The invention also relates to a server, characterized in that it includes:
- receiver means for receiving information about the movement of a person over a period of time in a building, said information being collected and transmitted by a portable device associated with said person; and
- constructor means for constructing at least one branch of a graph representing said building on the basis of the received movement information.

In an embodiment, the server also has means for allocating a room identifier to said branch as a function of: a predetermined list of rooms; at least one predefined usage rule concerning the usage of said rooms; and time-stamp movement information.

Finally, the invention provides a computer program product including instructions for performing the steps of a graph construction method as described above when loaded in and executed by a processor.

Other features and advantages of the present invention appear from the following description of embodiments given as non-limiting examples and with reference to the accompanying drawings, in which.

A particular implementation of the invention is described below with reference to FIGS. 1 to 3.

Figure 1:
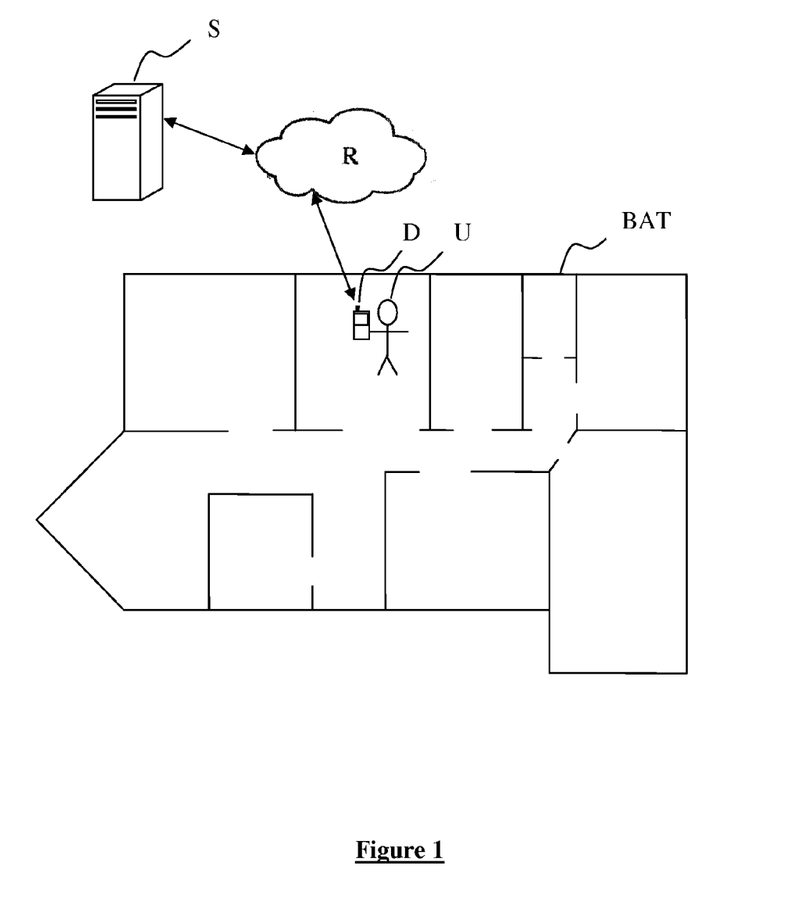
FIG. 1 illustrates the general context of the invention.

FIG. 1 shows the general context of the invention.

FIG. 1 shows a building BAT, e.g. an apartment, in which a person U with a portable device D moves about.

The portable device D is carried by the person U in such a manner that any movement of the user U gives rise to a similar movement of the portable device D. The portable device D may for example be inserted in a pocket of clothing worn by the person U.

The portable device D is suitable for collecting information about the movement of the person U and for transmitting that information to a remote server via a communications network R.

In the selected example and as shown, the server S is situated outside the building.

As an alternative, the server S may be situated in the building BAT and the portable device D may communicate with the server S via a wireless connection, e.g. of the WiFi type.

By way of example, the building BAT has five rooms: a kitchen, a bedroom, a lavatory, a bathroom, and a passage.

Alternatively, the number and nature of the rooms may be different.

Figure 2:
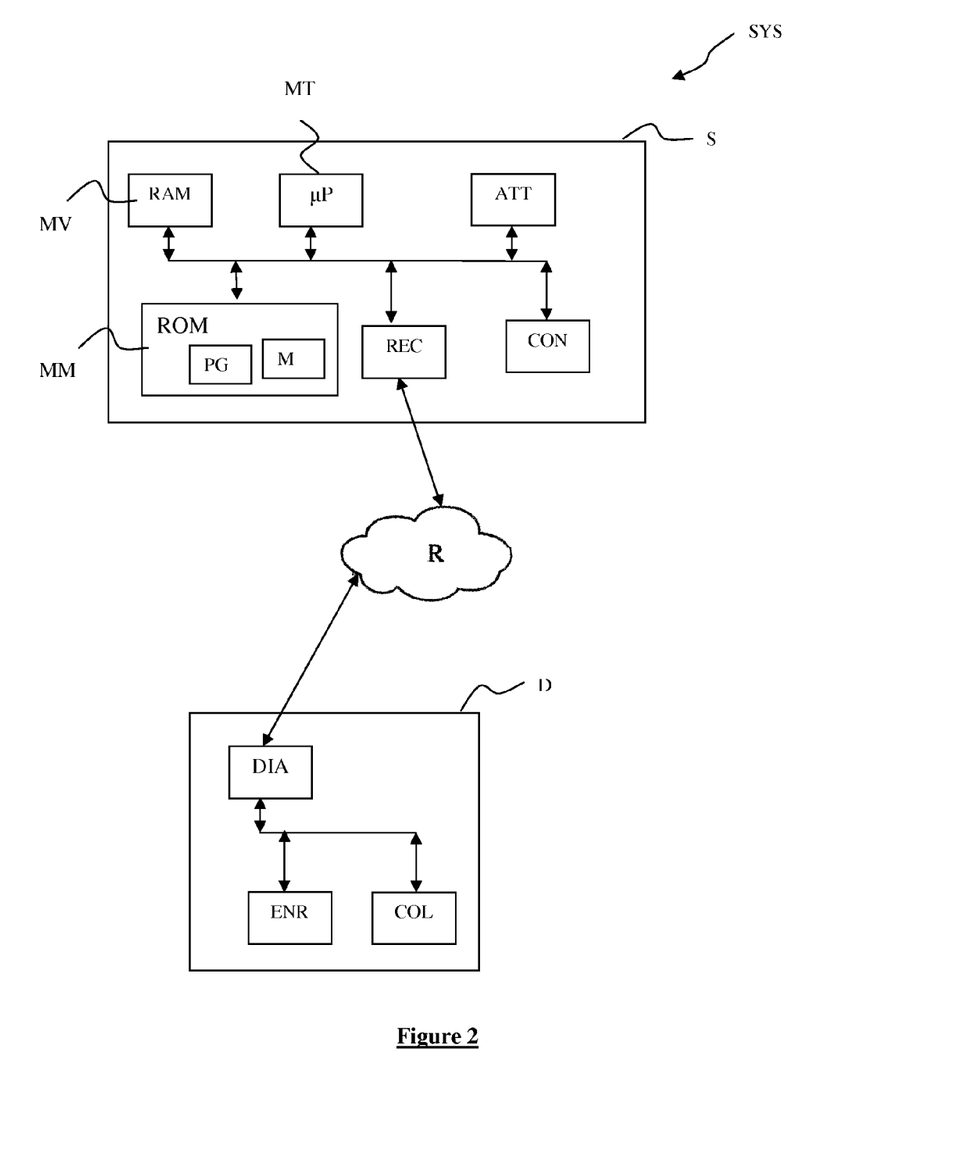
FIG. 2 shows a system suitable for performing a method of constructing a graph in an implementation of the invention.
Figure 3:
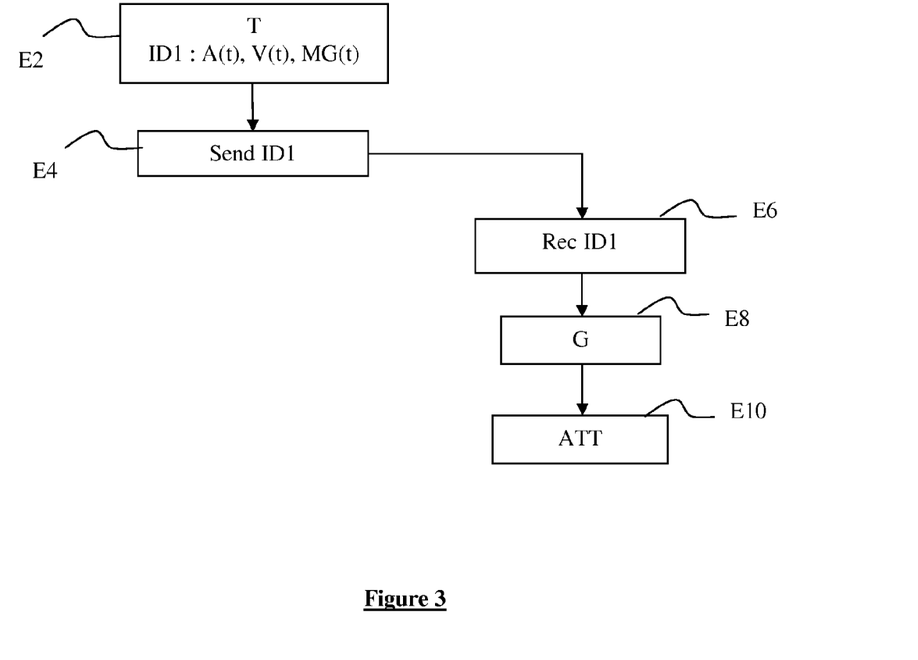
FIG. 3 is a flow chart showing the various steps of a method of constructing a graph in an implementation.

FIG. 2 shows an embodiment of a system SYS comprising the portable device D and the server S.

The portable device D has a communications module DIA suitable for communicating with the server S via the communications network R, a collector module COL for collecting movement information about the movements it performs, and a recorder module ENR for recording the collected movement information.

By way of example, the collector module COL comprises a magnetometer suitable for measuring a magnetic field, a gyro suitable for measuring an angular velocity, and an accelerometer suitable for measuring an acceleration.

Alternatively, the collector module COL comprises a gyro and an accelerometer.

By way of example, the collector module COL is an inertial navigation unit.

By way of example, the portable device D is a cell phone including an inertial navigation unit.

By way of example, the server S is a personal computer (PC) or a personal digital assistant (PDA).

The server S possesses in particular a processor unit MT having a microprocessor, volatile memory MV of the random access memory (RAM) type, and one or more non-volatile memories MM of the read only memory (ROM) or electrically erasable programmable read only memory (EEPROM) type, having programs recorded therein suitable for being executed by the microprocessor.

In conventional and non-exhaustive manner, the server S may include the following elements: a screen; a keyboard; a microphone; a loudspeaker; storage means; . . . .

The server S also has a receiver module REC, a constructor module CON, and an allocation module ATT.

The receiver module REC is suitable for receiving data via the network R, e.g. movement information coming from the portable device D.

The processor unit MT is controlled by a computer program PG so as to perform in particular the graph construction method in an implementation of the invention as described below with reference to FIG. 3.

The computer program PG comprises code instructions for performing the steps of the graph construction method and in particular the steps of receiving information about the movement of the person over a period of time within the building, said information being collected and transmitted by a portable device associated with the person, and for constructing at least one branch of said graph from the received movement information.

The computer program PG may also perform an allocation step of allocating an identifier of a room of said building to a branch of the graph as a function of: a predetermined list of rooms; at least one predefined rule concerning usage of said rooms; and timed movement information.

The computer program may also include code instructions for performing the steps of a method of remotely tracking the activity of a person in an implementation described below with reference to FIG. 11.

An implementation of the method of constructing a graph representing the building BAT and performed by the system SYS is described below with reference to FIG. 3.

In a step E2, the collector module COL of the portable device D collects information ID1 relating to the movements of the person U over a determined period of time T, e.g. one day.

More precisely, the collector module COL collects information relating to its own movement, which information in this example corresponds to the movements of the person U while the portable device D is associated with that person.

By way of example, the information ID1 that is collected comprises acceleration A(t), angular velocity V(t), and magnetic field MG(t).

The information ID1 is recorded by the recorder module ENR in an internal memory of the portable device as it is collected, and it is recorded in association with a time stamp.

By way of example, the collected information may be in the form of signals that are recorded as a function of time. The collected information thus constitutes timed information.

Alternatively, the information about movement corresponds to measurements that are taken periodically, e.g. once every 10 seconds, and recorded in association with a time stamp.

When the person U is not moving, the collector module COL records signals that do not present variations or signals that present a value of zero.

Alternatively, no signal is recorded when the user is not moving.

The information ID1 collected over the period of time T is transmitted by the module DIA from the portable device D to the server S via the communications network R during a step E4.

Alternatively, in particular when the recording memory of the portable device D is of small size, the collected data is transmitted regularly, e.g. once every hour.

The transited data is received by the module REC of the server S during a step E6.

All of the data collected over the period of time T is analyzed during a step E8.

During the step E8, the constructor module CON uses the received collected information ID1 to determine a graph G representing the building BAT.

The graph G has at least one branch.

Figure 4:
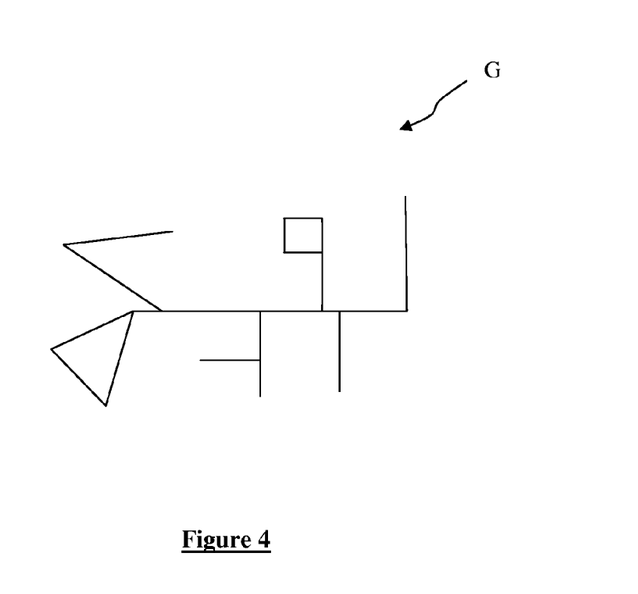
FIG. 4 shows an example of the graph that is obtained.

FIG. 4 shows an example graph G as determined for the building BAT.

An implementation of the construction step E8 is described in detail below with reference to FIG. 5.

Alternatively, the step E8 is followed by a step of receiving information about the modules of the person U over a new period of time, e.g. one day, later than the period of time T, and the step E8 is reiterated as a function of the received new information.

Then during a step E10, the allocation module ATT allocates a room identifier to one or more branches of the graph as a function of: a list of rooms; at least one predefined usage rule for the rooms; and time stamp movement information ID1.

Alternatively, the step E10 is not performed.

Alternatively, the method may include acquiring new information about the movement of the person over a new period of time, e.g. one day, later than the period of time T, and then reiterating steps E8 and E10. The new movement information then makes it possible to validate the graph that has been obtained, or on the contrary to modify it.

A particular implementation of the graph construction step E8 is described below.

Figure 5:
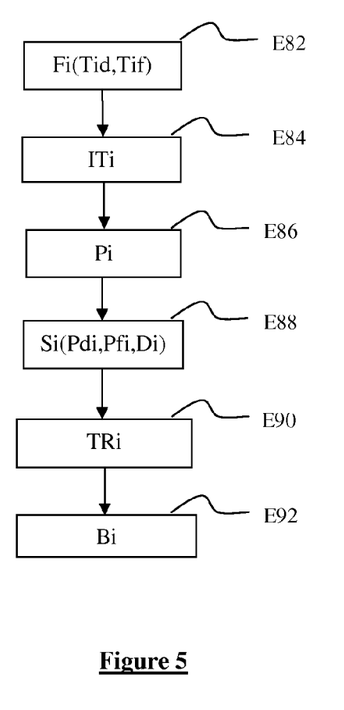
FIG. 5 is a flow chart showing the various steps of a construction step of a method of constructing a graph in an implementation.

With reference to FIG. 5, during a first substep E82, the constructor module CON uses all of the collected information ID1 to determine time windows Fi that correspond to movements of the person U.

During movement of the portable device D, and thus of the person U, the acceleration A(t) and/or the velocity V(t) recorded by the portable device D is/are non-zero. A time window Fi corresponds to a time interval during which the acceleration A(t) and/or the velocity V(t) are non-zero.

Each time window Fi is identified by a starting instant Tid and an ending instant Tif.

Figure 6:
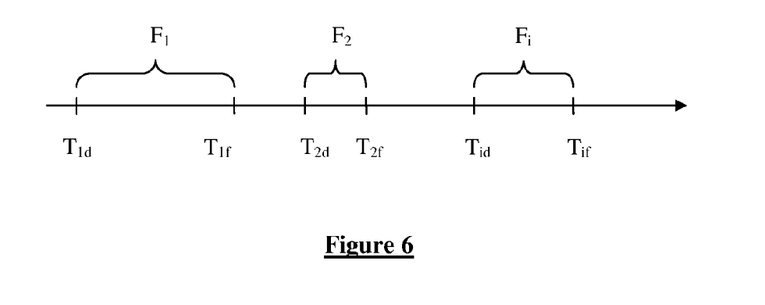
FIG. 6 shows an example of determined time windows.

FIG. 6 shows an example of determined time windows F1, F2, . . . , Fi.

During a step E84, the changes of direction that take place in each time window Fi are determined as a function of the signals A(t) from the accelerometer and MG(t) from the gyro, together with the time instants Tij associated with the changes of direction.

A time window Fi is thus subdivided into n time intervals ITi. A time interval ITi corresponds to a movement made in a single direction.

When no change of direction is detected over the time window Fi, a single time interval IT is determined that corresponds to the time window Fi.

Figure 7:
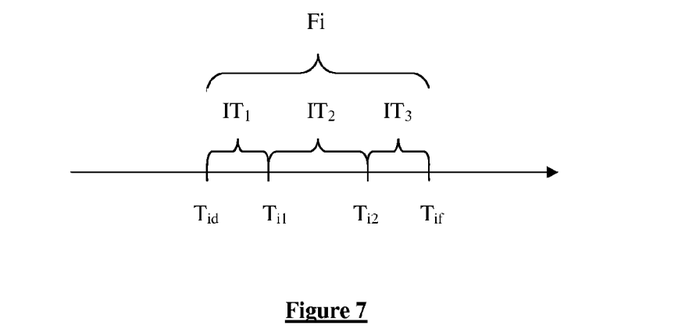
FIG. 7 shows an example of determined time intervals in a time window.

FIG. 7 shows an example of a time window Fi in which two changes of direction were determined. The changes of direction are associated respectively with time instants Ti1 and Ti2. Three time intervals IT1, IT2, and IT3 are determined that correspond to respective movements in respective directions.

Thereafter, during a step E86, the constructor module CON acts for each time interval ITi to determine the number of steps Pi made as a function of the signal delivered by the accelerometer A(t) over the time interval. The number of steps is representative of the distance traveled over the time interval ITi under consideration.

The number of steps Pi is obtained from an estimate of the length of a step. Exact knowledge of the distance traveled during each step would make it possible to obtain a graph of the environment that is genuinely to scale. Nevertheless, such information is difficult to obtain since step length varies from one person to another, in particular depending on how tall the person is. It is assumed herein that all steps are of the same length.

During a following step E88, a path segment Si is determined for each time interval ITi. A path segment Si corresponds to a movement made in a single direction.

A path segment Si is identified by a starting position Pdi, an ending position, Pfi, and a movement direction Di.

The ending position Pfi of the segment Si is a position defined relative to the starting position Pdi of that segment Si, as a function of the distance traveled during the time interval ITi, and as a function of the movement direction Di associated with the time interval ITi.

The starting position of a segment Si corresponds to the end position of the preceding segment.

Figure 8:
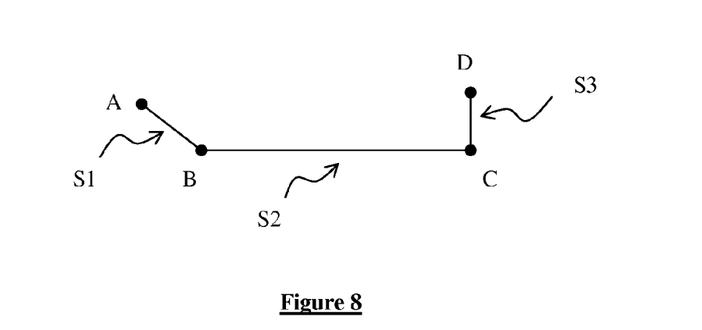
FIG. 8 shows an example of a segment obtained for the FIG. 7 time window.

FIG. 8 shows an example of segments determined for the time window Fi shown in FIG. 7.

The point A at the beginning of the movement is determined arbitrarily. A first segment S1 determined for the time interval IT1 has a starting position at A and an ending position that is determined as being at B. A second segment S2, determined for the time interval IT2, has a starting position B and an ending position C. A first segment S3, determined for the time interval IT3, has a starting position C and an ending position D.

Thus, by arbitrarily setting the starting position for the first time interval of the first time window F1, it is possible to determine the position of each segment and thereby obtain the movement path TJ of the person, in an arbitrary reference frame.

The starting point of the path TJ corresponds to the first detection of movement in the period of time T, for example.

Figure 9:
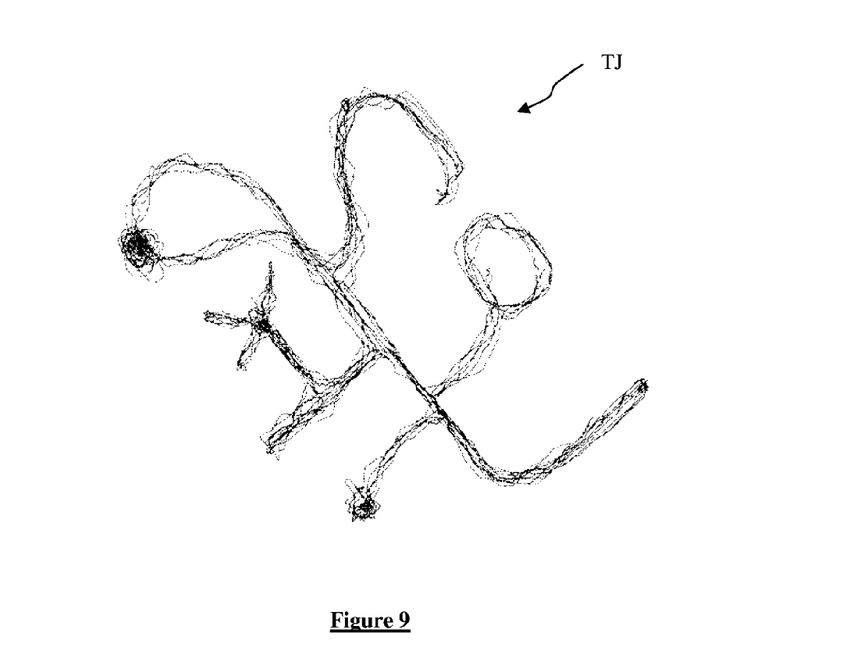
FIG. 9 shows an example of the travel path.

FIG. 9 shows an example of a movement path TJ in the building BAT.

During a step E90, the segments Si are grouped together as a function of their positions. A group of segments comprises segments having positions that are similar and the same direction. Two segments are similar in position if their starting and ending positions are situated on the same axis. A path segment TRi is a zone defined by a group of segments.

By way of example, the path segments are obtained by smoothing segments, e.g. by taking changes of direction into account only when they are greater than 60 degrees.

Smoothing also serves to reduce measurement errors due to noise concerning movement in a straight line.

Figure 10:
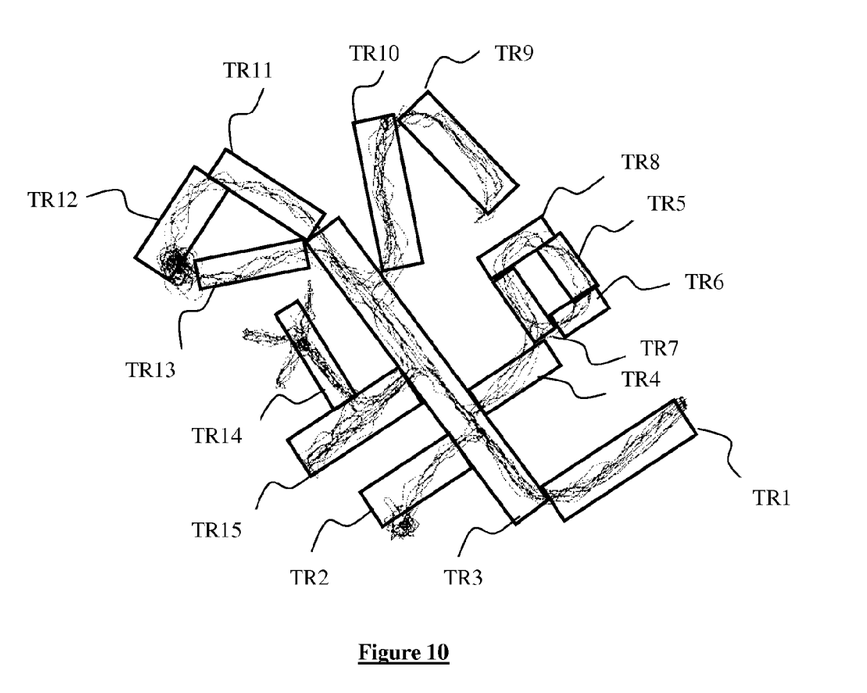
FIG. 10 shows an example of segments determined from a path.

FIG. 10 shows segments TRi as determined for the movement path TJ in the building BAT.

In this example, fifteen segments TR1, TR2, . . . , TR15 have been determined.

During a step E92, branches Bi are determined from the segments TRi and as a function of the movements of the person.

By way of example, the branch B1 comprises the segments TR9 and TR10, since whenever the person U follows the segment TR10, that person then follows the segment TR9, and vice versa.

In contrast, the segment TR3 does not belong to the branch B1, since during the movement of the person U along TR3, that person does not always go along the segment TR10 of the branch B1.

The segment TR3 in this example represents the trunk of the graph, and it is considered as being a special branch.

The set of branches Bi that are obtained constitute the graph G that represents the building BAT.

A particular implementation of the step E10 of allocating a room identifier to one or more branches of the previously-obtained graph G is described below.

By way of example, a set of predefined rules comprises two rules R1 and R2.

For example, the rule R1 is: "during the time period 11:00 PM to 6:00 AM, the person U is mainly in the bedroom".

For example, the rule R2 is: "in the range 12 noon to 2:00 PM, the person U is mainly in the kitchen".

The rules are constructed by a human operator or by an automatic learning system. They are constructed as a function of human activity over certain periods of the day, e.g. as a function of declaration made by the person U.

They are associated with time data: getting-up time, going-to-bed time, breakfast time, . . . . They are generally associated with daytime and/or night-time activities. For example, the person U may go to the lavatory at night but look at the television in daytime only.

The list L of rooms in the building BAT may be established and transmitted by the person U, for example.

A room identifier is associated with each room. The list of rooms and the associated identifiers is recorded in the server S, e.g. by a human operator.

In this example, the list L of rooms has five rooms: a kitchen, a bedroom, a lavatory, a bathroom, and a passage.

The identifier KIT is associated with the kitchen, an identifier BED is associated with the bedroom, an identifier WC is associated with the lavatory, an identifier BATH is associated with the bathroom, and an identifier PAS is associated with the passage.

The identifiers KIT, BED, WC, BATH, and PAS represent room identifiers.

As described above with reference to FIG. 5, a branch Bi is associated with path segment Si and a path segment Si is determined for a time interval ITi.

Thus, a branch Bi is associated with time intervals ITi of the period of time T.

By correlation between the time intervals ITi associated with a branch Bi of the graph G and the usage rules R1 and R2, the allocation module ATT allocates a room identifier to one or more branches.

The kitchen identifier KIT is allocated for example to the branch B1 as a function of rule R2.

The room identifier BED is allocated to the branch B3 as a function of the rule R1.

Thus, a room identifier is allocated as a function of: movement information; a list of rooms; and at least one usage rule.

Alternatively, a room identifier is allocated by taking account not only of movement information, but also of information provided by sensors present in the environment of the person (e.g. by an ammeter clamp) and received by the server S.

Also as an alternative, events may be detected on the electricity network, such as switching on an oven or a hot plate, switching on a television, . . . , for example, and may likewise be taken into account for allocating a room identifier to a branch of the graph.

When correlated with time-stamp movement information, these detected events serve to increase the reliability of the allocation stage.

For example, the detected event may be the portable device D being placed on a data-download space that is located in the person's bedroom. This event is correlated with movement information making it possible to identify the branch that corresponds to the bedroom.

The usage rules R1 and R2 are rules associated with determined time ranges.

As an alternative, a usage rule may contain one or more time ranges associated with respective weighting values.

For example, a usage rule suitable for allocating the room identifier KIT contains time ranges 8 AM to 9 AM, 11 AM to 12 noon, 7 PM to 8 PM, and a higher weighting value is associated with the 11 AM to 12 noon range. The weighting values are obtained from a statement made by the person U or by learning.

A usage rule may also take account of a spectral distribution of times that are equally weighted. Rules of this type are particularly adapted to allocating the WC room identifier.

A room identifier may also be allocated by elimination.

Figure 11:
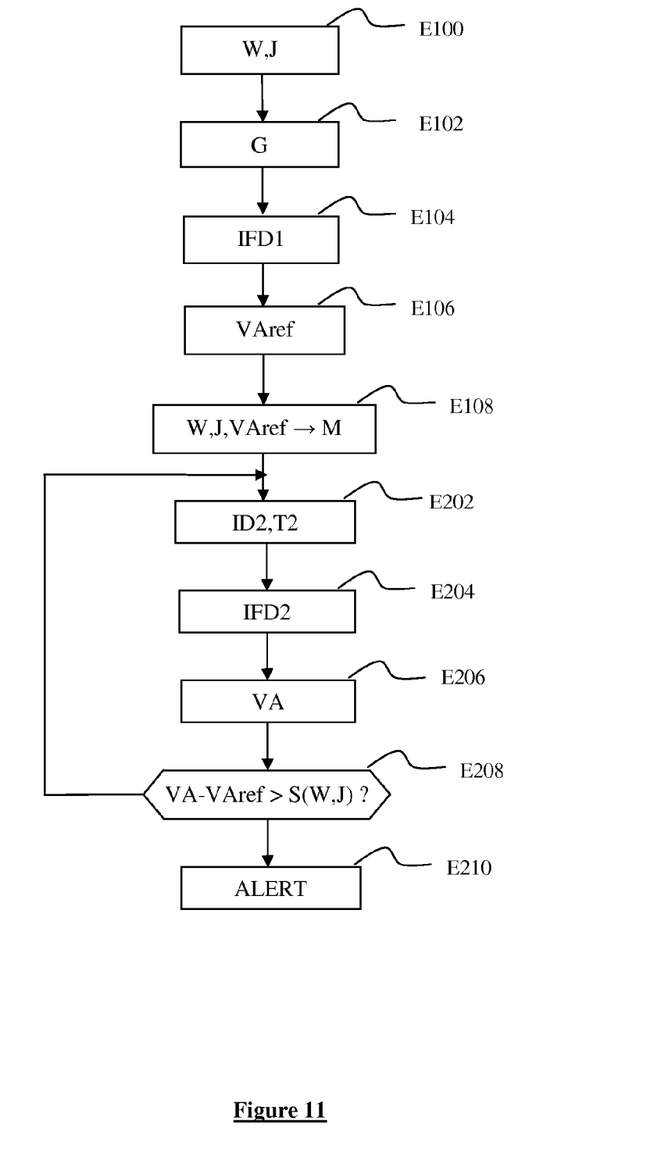
FIG. 11 is a flow chart showing the various steps of a method of remotely tracking the activity of a person in an implementation.

With reference to FIG. 11, an implementation of a method of remotely tracking the activity of a person in the building BAT is described below.

During a first prior step E100, a room identifier W is recorded in association with a time interval J in a memory of the server S.

The room identifier W and the time interval J associated therewith represent an activity ACT.

For example, the "mid-day meal" activity is represented by the room segment KIT and the time interval "12 noon to 2 PM".

Alternatively, it is possible to record a plurality of pairs, each comprising a room identifier W and a time interval J.

In a second prior step E102, a graph G representing the building BAT is constructed as a function of collected and time-stamped movement information ID1 for a period of time T. This graph may for example be the above-described graph G.

During a step E104, the server S extracts movement information IFD1 relating to the time interval J from the collected movement information ID1.

During a step E106, the server S calculates a reference value VAref representative of the activity of the person U for the room identifier W associated with the time interval J.

The reference value VAref is calculated as a function of the graph G and of movement information IFD1 relating to the time interval J.

For example, the reference value for the time interval "12 noon to 2 PM" and the room identifier KIT is the time passed in the kitchen between 12 noon and 2 PM, and the calculated reference value is "30 minutes".

In another example, the reference value for the time interval corresponding to one day (24 hours) and the room identifier KIT is "1 hour". The value representative of the activity in this example corresponds to the time passed in the kitchen during one day.

In the implementation described, the room identifier W is an identifier representing a room of the building BAT. Alternatively, the room identifier W is an identifier representing a plurality of rooms of the building BAT.

During a step E108, the calculated reference value VAref is recorded by the server S in a memory of the server S, e.g. a memory zone M of the memory MM (FIG. 2), in association with the time interval J and the room identifier W.

The steps E104 to E108 represent a learning stage.

During a subsequent step E202, the server S receives second time-stamped movement information ID2 collected by the portable device D over a second period of time T2.

By way of example, the second period of time T2 is equal to a 24-hour period situated one month after the time period T.

Alternatively, the second period of time T2 is of a duration that is different from that of the period of time T.

During a step E204, the server S extracts second movement information IFD2 relating to the time interval J from the collected second movement information ID2.

During a step E206, the server S calculates an activity value VA for the room identifier W associated with the time interval J.

The current value VA is representative of the activity of the person U during the time interval J.

The current value VA is calculated as a function of the graph G and of the second movement information IFD2 relating to the time interval J.

The steps E204 and E206 are similar to the steps E104 and E106 of the learning stage.

During a step E208, the server S compares the current value VA with the reference value VAref.

If the difference between the current value VA and the reference value VAref is greater than a predetermined threshold S(W,J), the server S triggers an alert process (step E210).

By way of example, the threshold S(W,J) is recorded in association with the room identifier W and the time interval J during the step E104.

Alternatively, if the difference between the current value VA and the reference value VAref is greater than the threshold S(W,J), the steps E202 to E208 are reiterated over several periods of time, e.g. several days, and the alert is triggered if the difference between the current value VA and the reference VAref is greater than the threshold S(W,J) over several days.

In the above-described implementation, a room identifier W is associated with a time interval J. Alternatively, a room identifier W may be associated with a plurality of time intervals J.

The invention claimed is:

1. A graph construction method for constructing, with a processor, a graph representing a building in which a person moves, the method comprising:

receiving, by a remote tracking server over a communications network, a first signal representative of time-stamped information from one or more motion-deriving sensors of a portable device associated with the person, the information relating to the movement of the person over a first period of time in the building, the information being collected from the one or more motion-deriving sensors and being wirelessly transmitted by the portable device over the communications network to the server;

in response to the received first signal, determining, by the server, a plurality of path segments from received movement information received from only the one or more motion-deriving sensors, each path segment being identified by a starting position, an ending position, and a movement direction in an arbitrary reference frame, each path segment corresponding to a movement made in a single direction during a time interval, the ending position of each path segment being defined relative to the starting position of that segment, the starting position being the end position of a preceding segment, the starting position for a first segment of the plurality of segments being defined arbitrarily;

determining, by the server, a plurality of groups of path segments as a function of positions and of movement direction of the determined path segments;

constructing, by the server, at least one branch of the graph from the determined plurality of groups of path segments and from movements of the person;

allocating, by the server, a room identifier identifying a room of the building to the at least one branch as a function of the received time stamped movement information and at least one predetermined usage rule associated with determined time ranges;

calculating at least one reference value representative of an activity of the person for the room identifier and for a time interval associated with the room identifier;

receiving, by the server, time stamped movement information collected over a second period of time subsequent to the first period of time;

calculating at least one current value representative of an activity of the person during at least one time interval included in the second period of time;

comparing the at least one current value with the at least one reference value;

triggering, by the server, an alert process if the difference between the compared values is greater than a predetermined threshold;

determining changes in movements of the person over time based on the constructed at least one branch; and based on the determination, transmitting to a user over the communications network a signal regarding the determined changes.

2. The graph construction method according to claim 1, further comprising allocating the room identifier as a function of a predetermined list of rooms and at least one predefined usage rule relating to the rooms.

3. The graph construction method according to claim 2, wherein the allocation of a room name is also a function of a measurement performed by a sensor in the building and/or of an event that is detected in the electrical circuit of the building.

4. The graph construction method according to claim 2, further comprising receiving further information relating to the movement of the person, and wherein the constructing and allocating are reiterated as a function of the further information.

5. The graph construction method according to claim 1, wherein constructing at least one branch comprises:

determining a path followed by the person during the movements as a function of received movement information; and determining at least one path segment corresponding to a geographical zone.

6. The graph construction method according to claim 1, wherein the collected movement information comprises angular velocity, acceleration, and magnetic field.

7. The graph construction method according to claim 1, wherein the movement information is collected relative to three axes in a three-dimensional reference frame.

8. The graph construction method according to claim 1, wherein the movement information is collected by an inertial navigation module of the portable device.

9. The graph construction method according to claim 1, wherein the portable device is a cell phone fitted with an inertial navigation module.

10. The method of claim 1, further comprising:

processing the movement information to determine a pattern of movement; and triggering the alert process based on a deviation of the movement from the determined pattern.

11. The method of claim 1, further comprising:

grouping the path segments together as a function of positions of the path segments and as a function of directions of the path segments, wherein each group of the plurality of groups comprises path segments having positions that are similar and in a same direction.

12. The method of claim 1, wherein each group of path segments of the plurality of groups comprises segments having starting and ending positions situated on the same axis and disposed in same direction.

13. A remote tracking server, the server comprising;

a receiver component configured to receive over a communications network a first signal that is representative of time-stamped information from one or more motion-deriving sensors of a portable device associated with a person, the information relating to the movement of the person over a first period of time in a building, the information being collected from the one or more motion-deriving sensors and being wirelessly transmitted by the portable device over the communications network to the server; and a constructor component configured to:

in response to the received first signal, determine a plurality of path segments from received movement information received from only the one or more motion-deriving sensors, each path segment being identified by a starting position, an ending position, and a movement direction in an arbitrary reference frame, each path segment corresponding to a movement made in a single direction during a time interval, the ending position of each path segment being defined relative to the starting position of that segment, the starting position being the end position of a preceding segment, the starting position for a first segment of the plurality of segments being defined arbitrarily;

determine; by the server, a plurality of groups of path segments as a function of positions and of movement direction of the determined path segments; and construct at least one branch of a graph representing the building on the basis of the determined plurality of groups of path segments and from movements of the person;

allocate, by the server, a room identifier identifying a room of the building to the at least one branch as a function of the received time stamped movement information and at least one predetermined usage rule associated with determined time ranges;

calculate at least one reference value representative of an activity of the person for the room identifier and for a time interval associated with the room identifier;

receive, by the server, time stamped movement information collected over a second period of time subsequent to the first period of time;

calculate at least one current valent representative of an activity of the person during at least one time interval included in a second period of time;

compare the at least one current value with the at least one reference value;

trigger, by the server, an alert process if the difference between the compared values is greater than a predetermined threshold;

determine changes in movements of the person over time based on the constructed at least one branch; and based on the determination, transmit to a user over the communications network a signal regarding the determined changes.

14. A non-transitory computer-readable medium including instructions for implementing the graph construction method according to claim 1 when loaded and executed on a processor.

* * * * *